UNITED STATES PATENT OFFICE.

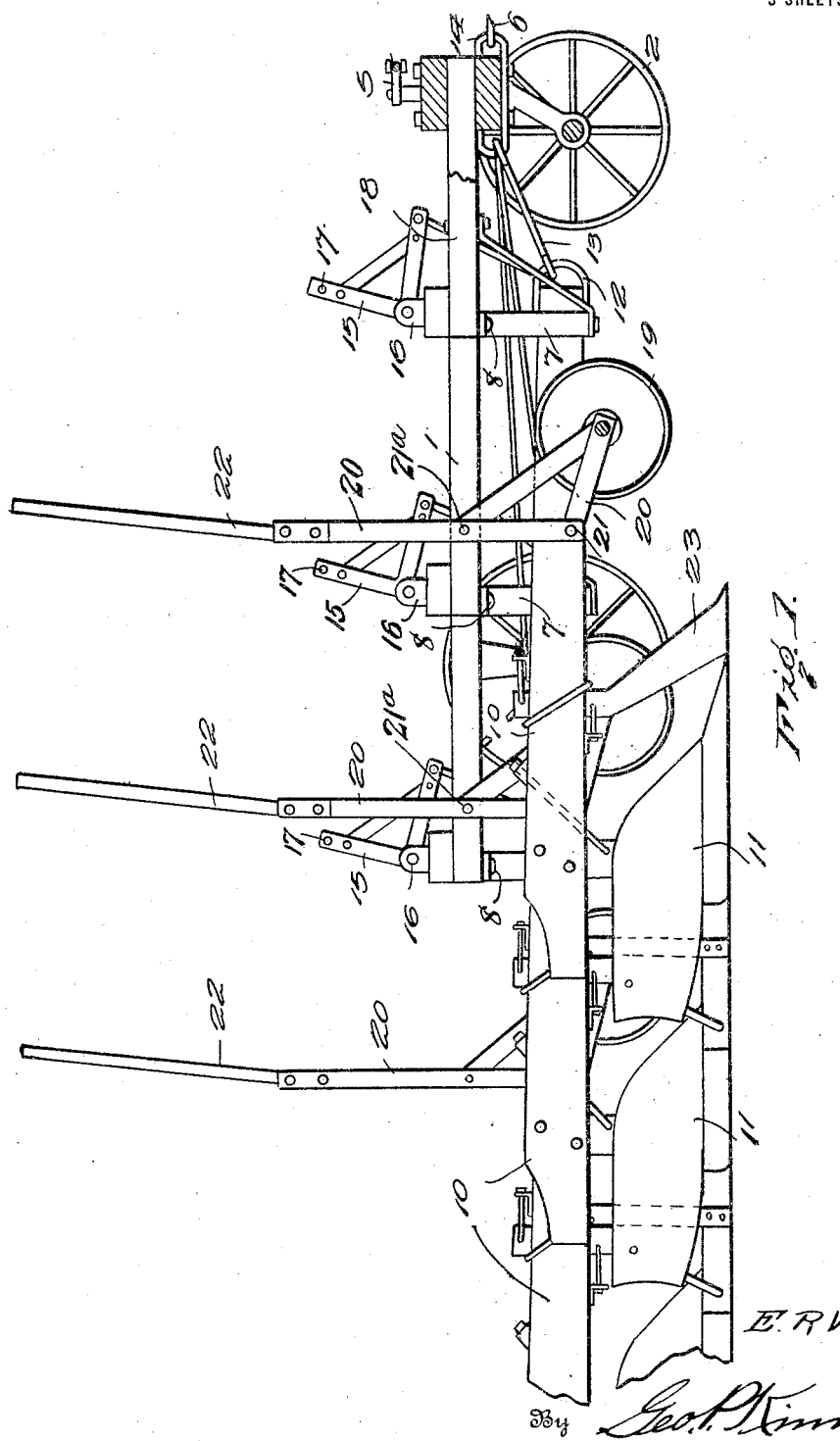

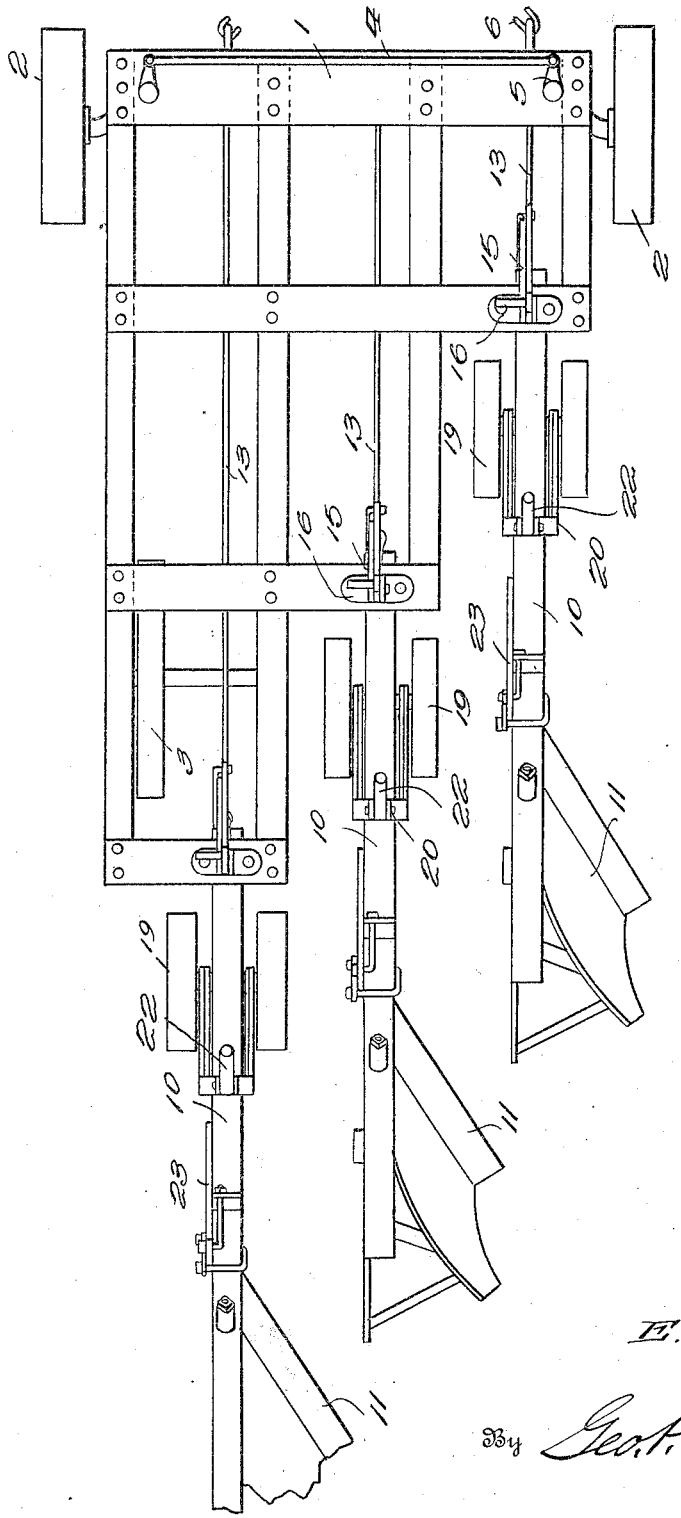

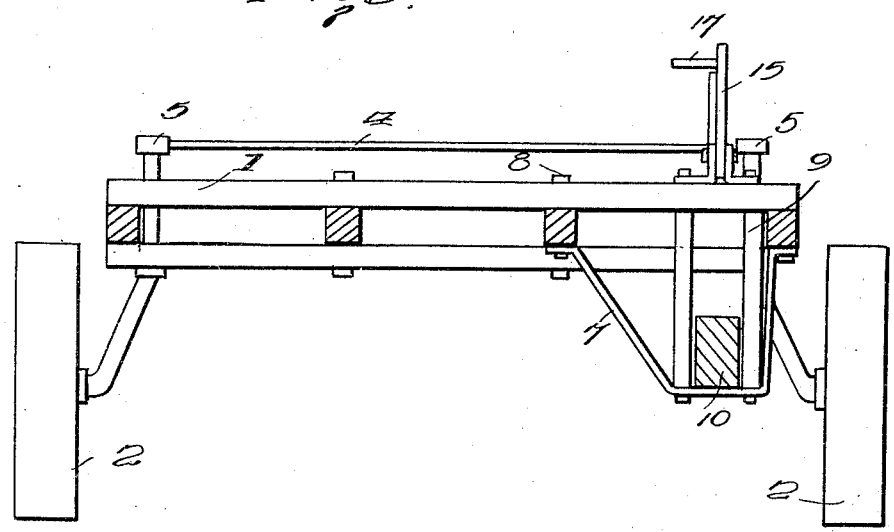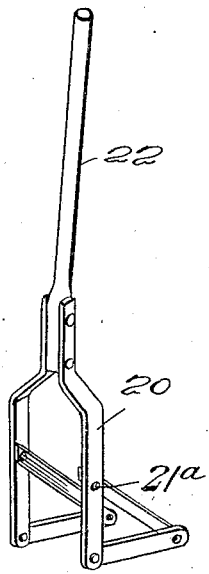

ERNEST R. VEHRS, OF NEKOOSA, WISCONSIN.

GANG-PLOW.

1,362,454.   Specification of Letters Patent.   Patented Dec. 14, 1920.

Application filed March 16, 1918. Serial No. 222,943.

*To all whom it may concern:*

Be it known that I, ERNEST R. VEHRS, a citizen of the United States, residing at Nekoosa, in the county of Wood and State of Wisconsin, have invented certain new and useful Improvements in Gang-Plows, of which the following is a specification.

This invention relates to improvements in plows of the gang type and it is the principal object of the invention to provide a gang plow in which the various plows comprising the gang are so arranged with relation to each other as to allow independent movement thereof during operation, that is movement through earth, and as a consequence, permit independent adjustment whereby, should they engage a stump, rock or other obstacle they will be enabled to move sufficiently to usually pass the same, thus, preventing the damaging of the construction and also avoiding the waste of time and labor heretofore caused by the removing of the plow and the readjusting or reëngaging of it.

Another and equally important object of the invention is to provide means whereby, should it become necessary, any one of the plows can be moved manually for elevating the same to disengage itself from an obstacle or be readjusted with relation to the earth.

Other objects will be in part obvious and in part pointed out hereinafter.

The invention consists, furthermore, in the novel arrangements and combinations of parts of the plow, as well as in the details of the construction of the same, all of which will be more fully described in the following specification and then finally embodied in the clauses of the claim which are appended to this specification and which form an essential part of the same.

In the drawings:

Figure 1 is a side elevation of the improved gang plow, having parts shown in sections, Fig. 2 is a top plan thereof, Fig. 3 is a vertical transverse section through the frame showing the connection of the plow beam therewith, and Fig. 4 is a detail in perspective of the means for adjusting the gage wheels and affecting corresponding adjustment of the plow.

Having more particular reference to the drawings, in connection with which like reference characters will designate corresponding parts throughout the several views, 1 represents the frame of the construction in its entirety, the same being formed of longitudinally and transversely disposed interconnected bars varying in length and so arranged as to form a stepped rear end, the purpose of which will be hereinafter apparent. Front wheels 2 are mounted on suitable axles secured to the forward end of the frame 1 while a rear wheel 3 is mounted on the rear end of the same and, of course, serves for an obvious purpose. To effect corresponding movement of the wheels 2, which as will be noted, are carried on pivotally mounted axles, a connecting link 4 is engaged with arms 5 arranged on the vertical portions or spindles of said axles. Further, suitable forms of draft connection, indicated by the numeral 6 are also arranged on the forward end of the frame.

A plurality of brackets generally indicated by the numeral 7 are secured to the underside of the stepped rear end of the frame 1 by bolts 8 or similar fastening devices and receive the lower ends of spacing or guide rollers 9 thereon, the upper ends of these rollers being engaged with the adjacent portions of the frame in a suitable manner. The beams 10 of the various plows 11 composing the gang are normally seated on the spaced brackets 7 between the spacing or guide rollers 9 and as will be noted, have forms of clevises 12 secured to their forward extremities, which clevises are in turn loosely engaged by the adjacent ends of connecting links 13 varying in length and having their remaining ends loosely engaged with brackets 14 secured to the forward end of said frame 1. Obviously, by so connecting the plows to the wheeled frame, relative movement of the same during operation, that is, during movement of the same through earth, will be permitted, and as a consequence, they will be enabled to automatically adjust themselves with relation to the earth or to various obstacles with which they may be engaged during such movement. Further, by so connecting the plows to the stepped rear end of the frame 1, they will be arranged forwardly of each other.

Carried by the frame 1, are bell crank foot operated levers 15 which are pivotally mounted in brackets 16, secured to the rear end of said frame 1, in spaced relation and at points adjacent to the various stepped marginal portions thereof. Pedals 17 are secured to certain of the extremities of these levers 15, and in this way facilitate engagement with the same, so that each lever can be manually operated by the foot of the operator, while connecting rods 18 are pivotally engaged with the remaining extremities of said levers and extend downwardly therefrom, where they are loosely engaged with the clevises 12. Thus by rocking the bell crank levers 15 in the proper direction, the said levers will serve in raising the plow beams 10 at their forward ends, which will be held in raised or elevated position, through the instrumentality of hand adjusted gage wheels hereinafter described.

To effect positive disengagement of the various plows from the earth, pairs of gage wheels 19 are journaled between the lower extremities of bifurcated bearing elements 20, which in turn are pivotally engaged with the plow beams 10 as at 21, while levers 22 are engaged with the upper portions of said bearing elements 20 and afford means for facilitating the rocking of the same and the resultant movement of the various pairs of gage wheels carried thereby. As a consequence, upon movement of said gage wheels downwardly, the forward end portions of the beams will follow them down and the plows carried on their respective beams will be elevated and in this way, disengaged or immediately adjusted with relation to an obstacle engaged thereby so as to permit passage of the same thereover. At this time, the lever may be released and the plow will again engage the earth to the proper depth automatically. If the lever is moved to raise the gage wheel the entire beam will be swung upwardly from its forward end and the plow moved upwardly. It is understood of course, that when any one of the plow beams 10 is to be raised, an operator actuates the bell crank lever 15, connected to the selected beam, so that the forward end thereof will be elevated, and should it be desired to hold the said beam in raised position, the operator will then manipulate the lever 22 for moving the same in a direction to lower the gage wheel 19, so that this gage wheel when brought in contact with the ground will sustain the selected plow beam 10 in raised position.

Colters 23 may be and preferably are clamped to the plow beam slightly forward of the points of their respective plows 11, thus affording an efficient earth breaking means.

From the foregoing, it will be readily understood by persons skilled in the art that I have provided an exceedingly simple, strong and durable gang plow construction and further, a form of gang plow, which, due to the mode of connection of the various plows with the wheeled frame thereof will permit said plows to automatically adjust themselves so as to usually allow the same to pass obstacles arranged in the path of travel thereof. However, should the self adjustment of the plows be insufficient to allow passage of the same by the obstacles, they may be then properly raised by the levers 15 or 22 by manually manipulating the same. Further, the plows and their respective beams will be prevented from imparting abnormal stress or strain to the frame 1 and as a consequence, distortion of the same will be prevented. It is also pointed out, that due to the engagement of the levers 15 and 22 with the various beams 10, said beams may be readily raised by an operator with but comparatively little effort.

Manifestly, the construction shown is capable of considerable modification and such modification as is within the scope of my claims, I consider within the spirit of my invention.

I claim:

1. In a gang plow, a wheeled frame, a plurality of brackets secured to the under side of the frame, spaced vertical rollers supported in said brackets, a plurality of spaced plows having beams with their forward ends resting in the brackets between said rollers, means for loosely connecting the forward ends of said beams with said frame to permit free vertical movement of the beams, and foot operated means connected with the forward end of each beam for elevating said forward end of the beam in the bracket.

2. In a gang plow, a wheeled frame, a plurality of brackets secured to the under side of the frame, spaced vertical rollers supported in said brackets, a plurality of spaced plows having beams with their forward ends resting in the brackets between said rollers, means for loosely connecting the forward ends of said beams with said frame to permit free vertical movement of the beams, foot operated means connected with the forward end of each beam for elevating said forward end of the beam in the bracket, each beam being provided with a gage device.

3. In a gang plow, a frame, supporting brackets carried by the frame, plows having beams extending through the brackets, attaching means for the forward end portions of the beams for loosely connecting the said beams with the frame, and foot operated means connected with the forward ends of the beams, and elevating said ends independently of each other.

In testimony whereof I affix my signature hereto.

ERNEST R. VEHRS.